US008726123B2

(12) United States Patent
Goettfert et al.

(10) Patent No.: US 8,726,123 B2
(45) Date of Patent: May 13, 2014

(54) BIT ERROR CORRECTION FOR REMOVING AGE RELATED ERRORS IN A BIT PATTERN

(75) Inventors: Rainer Goettfert, Putzbrunn (DE); Berndt Gammel, Markt-Schwaben (DE); Thomas Kuenemund, Munich (DE)

(73) Assignee: Infineon Technologies AG, Neubiberg (DE)

( * ) Notice: Subject to any disclaimer, the term of this patent is extended or adjusted under 35 U.S.C. 154(b) by 104 days.

(21) Appl. No.: 13/548,462

(22) Filed: Jul. 13, 2012

(65) Prior Publication Data

US 2013/0185611 A1    Jul. 18, 2013

(30) Foreign Application Priority Data

Jul. 15, 2011    (DE) .......................... 10 2011 079 259

(51) Int. Cl.
*H03M 13/00*    (2006.01)

(52) U.S. Cl.
USPC ............. 714/758; 714/766; 380/43; 713/161; 713/181

(58) Field of Classification Search
USPC ............. 714/758, 766; 380/43; 713/161, 181
See application file for complete search history.

(56) References Cited

U.S. PATENT DOCUMENTS

| 6,697,311 | B1 * | 2/2004 | Kim ............................. 369/59.1 |
| 7,092,464 | B2 * | 8/2006 | Mills ............................. 375/346 |
| 2008/0195888 | A1 * | 8/2008 | Shuma ............................. 714/5 |
| 2009/0285061 | A1 * | 11/2009 | Nagai ............................. 369/47.3 |
| 2011/0214029 | A1 * | 9/2011 | Steiner et al. ................. 714/746 |

OTHER PUBLICATIONS

Yu, M.-D. et al. "Secure and Robust Error Correction for Physical Unclonable Functions." IEEE Design & Test of Computers, vol. 27, Nr. 1, 2010. pp. 48-65.

* cited by examiner

*Primary Examiner* — Guy Lamarre
(74) *Attorney, Agent, or Firm* — Murphy, Bilak & Homiller, PLLC

(57) ABSTRACT

A bit error corrector includes an aging bit pattern memory operable to store at least one aging bit pattern which conveys aging-related effects within a succession of uncorrected bit patterns, a bit pattern modifier operable to modify a current, uncorrected bit pattern using the at least one aging bit pattern and generate a modified bit pattern, and a bit pattern comparator operable to compare the current uncorrected bit pattern with a corrected bit pattern which is based on the modified bit pattern and determine a corresponding comparative bit pattern. An aging bit pattern determiner is operable to recursively determine a new aging bit pattern based on the at least one aging bit pattern and the comparative bit pattern, and store the new aging bit pattern in the aging bit pattern memory for use during modification of a subsequent uncorrected bit pattern by the bit pattern modifier.

20 Claims, 7 Drawing Sheets

BIT ERROR CORRECTION FOR REMOVING AGE RELATED ERRORS IN A BIT PATTERN

PRIORITY CLAIM

This application claims priority to German Patent Application No. 10 2011 079 259.7 filed on 15 Jul. 2011, the content of said German application incorporated herein by reference in its entirety.

TECHNICAL FIELD

Exemplary embodiments of the present invention provide a bit error corrector for correcting age-related errors in a bit pattern, such as may arise in connection with physical hash functions (physically unclonable function (PUF)). Further exemplary embodiments of the present invention provide a bit error correction method which can be used particularly for correcting age-related errors in a bit pattern, and also an appropriate computer program.

BACKGROUND

When transmitting or storing digital data in the form of digital data bits, bit errors are normally scarcely avoidable. Frequently, the bit errors are random. An opportunity for recognizing and possibly even correcting bit errors in transmitted or stored data bits is provided particularly by redundancy-based error recognition methods and error correction methods. These are based on further data being transmitted and stored in addition to the actual data bits, which further data reveal whether a bit error is present and can possibly be corrected within the data bits.

Bit patterns which represent data can also be obtained using a physical hash function (PUF). The idea on which a physical hash function is based is to digitize physical properties of an object and thus to obtain a bit succession (number or digit) which is associated with the object.

In this case, it is desirable for the bit successions of two different physical objects to be uncorrelated to one another. A simple example for the purposes of illustration is a sheet of paper. When viewed under a microscope, it is possible to see a specific fine structure of the wood chips or pulp portions. The structure is measured using a suitable algorithm, and the result is represented as a bit succession. This bit succession is the PUF. Another sheet of paper generally produces a bit succession which is uncorrelated to the bit succession of the first sheet.

Using the physical hash function or physically unclonable function (PUF), it is now possible to determine, at a first time, a bit pattern which is characteristic of the physical properties of the respective object to the first time. By way of example, this bit pattern can be used to encrypt useful data. In order to decrypt the useful data again at a later time, the same bit pattern is required again. The bit pattern required can in turn also be obtained at the second time from the physical properties of the object, but with slight discrepancies from the bit pattern produced at the first time being expected. As the interval of time between the first and second times increases, the physical properties of the object can alter permanently, which results in particular discrepancies in the bit pattern occurring ever more frequently and finally almost always. Added to the age-related discrepancies are typically also random discrepancies between the bit patterns generated at the first time and at the second time, which means that after a particular time it is no longer possible to ensure reliable correction of the bit pattern.

SUMMARY

Embodiments described herein ensure correction of a bit pattern more reliably, even when there is a relatively long period of time between the times of original use and current use of the bit pattern.

Exemplary embodiments of the present invention provide bit error correction which comprises an aging bit pattern memory, a bit pattern modifier, a bit pattern comparator and an aging bit pattern determiner. The aging bit pattern memory is configured to store at least one aging bit pattern which conveys aging-related effects within a succession of uncorrected bit patterns. The bit pattern modifier is configured to modify a current uncorrected bit pattern using the at least one aging bit pattern, wherein the bit pattern modifier produces a modified bit pattern. The bit pattern comparator is configured to compare the current, uncorrected bit pattern with a corrected bit pattern which is based on the modified bit pattern, and also to determine a corresponding comparative bit pattern. The aging bit pattern determiner is configured to recursively determine a new aging bit pattern on the basis of the at least one aging bit pattern and the comparative bit pattern. The aging bit pattern determiner is also configured to store the new aging bit pattern in the aging bit pattern memory for use during the modification of a subsequent uncorrected bit pattern by the bit pattern modifier.

Exemplary embodiments are based on the concept of observing the discrepancies which can be established between the successive uncorrected bit patterns and the corrected bit pattern(s). Particularly when age-related bit errors or other relatively stable systematic discrepancies between the uncorrected bit patterns and the corrected bit patterns occur, this can be utilized by the bit error corrector. The aging-related effects or the other systematic effects permit reasoned assumptions about the correctness or the incorrectness of individual components of the uncorrected bit pattern, normally of individual bits. These reasoned assumptions are based on the fact that the age-related or other systematic effects are distinctly not purely random.

When using a bit error corrector based on the technical teaching disclosed herein, other measures for bit error correction can be kept relatively simple. In particular, in the case of redundancy-based error correction methods which, besides the bit error correction disclosed herein, make corrections to the uncorrected bit pattern or the modified bit pattern, it will suffice for less redundancy information to be stored and processed. This relatively low complexity for the redundancy-based bit error correction normally results in higher speed, lower circuit complexity and/or lower power consumption in the redundancy-based error correction. A further point is that less redundancy information needs to be available, i.e. fewer redundancy bits are required. Since every additional redundancy bit reveals information about the sometimes secret corrected bit pattern, it is desirable to provide as few redundancy bits as possible.

According to further exemplary embodiments, the bit error corrector may comprise an input for the succession of uncorrected bit patterns which is configured to be connected to an output of a generator for a bit pattern based on a physical hash function (PUF), wherein the aging-related effects can be attributed essentially to the physical hash function. The uncorrected bit patterns therefore correspond to the output bit patterns successively produced by the physical hash function. By way of example, the aging-related effects may exhibit themselves in the form of stable good bits and/or stable incorrect bits within the output bit pattern produced by the physical hash function.

According to further exemplary embodiments, the bit error corrector may comprise an initializer for resetting the at least one aging bit pattern which is stored in the aging bit pattern memory to an initial value. By way of example, the initial value may be an all zeros bit pattern or an all ones bit pattern. Normally, such a choice of initial value means that it is initially assumed that, in principle, age-related or systematic effects can occur at all locations in the uncorrected bit pattern. Following an iteration or a plurality of iterations in which new, uncorrected bit patterns are processed in each case, it then emerges more and more at what locations in future uncorrected bit patterns there is the increasing expectation of an occurrence of aging-related or systematic effects.

According to further exemplary embodiments, the aging bit pattern memory may be configured to also store at least one further aging bit pattern which relates to at least one preceding recursion. The aging bit pattern determiner may then be configured to identify a trend for the aging-related or systematic effect using the aging bit pattern and the at least one further aging bit pattern and to use it for recursively determining the new aging bit pattern.

According to some exemplary embodiments, the aging bit pattern determiner may comprise a counter which is configured to count a manifestation of an aging-related effect on at least one bit of the uncorrected bit patterns in the comparative bit pattern, the aging bit pattern and the at least one further aging bit pattern. The aging bit pattern determiner may be configured to make allowance for a corresponding counting result during the recursive determination of the at least one bit of the aging bit pattern. The comparative bit pattern essentially indicates at what locations the uncorrected bit pattern and the corrected bit pattern differ from one another, and at what locations they match. The aging bit pattern and the at least one further aging bit pattern also contain an appropriate piece of discrepancy or match information, which also includes a history of earlier uncorrected bit patterns, however. By way of example, the comparative bit pattern, the aging bit pattern and the at least one further aging bit pattern can be used to establish how often within a number n of preceding iterations a particular bit in the uncorrected bit pattern has matched the corresponding bit of the corrected bit pattern. If a significant statistical distortion can be established for this evaluation, this statistical distortion can be utilized by the aging bit pattern determiner to make a presumably better prediction of the aging-related effects in subsequent, uncorrected bit patterns.

According to some embodiments, the aging bit pattern determiner may comprise a filter which is configured to filter at least one bit in the comparative bit pattern and in at least one from the aging bit pattern and the at least one further aging bit pattern and to make allowance for a corresponding filter result during the recursive determination of the at least one bit of the aging bit pattern. By way of example, the filter can provide a higher weighting for more recent perceptions about discrepancies or matches between individual bits in the uncorrected bit patterns than for older perceptions.

According to further exemplary embodiments, the bit error corrector may comprise a redundancy memory for storing a piece of redundancy information and a redundancy-based error correction unit for correcting bit errors in the uncorrected bit pattern or the modified bit pattern using the redundancy information. In some exemplary embodiments, the redundancy-based error correction unit may be part of the bit pattern modifier. The redundancy-based error correction unit can be used to correct random bit errors which can typically be observed in the uncorrected bit patterns. In addition, the redundancy-based error correction unit can retrospectively correct bits which have erroneously been regarded as incorrect on account of the at least one aging bit pattern but which were actually correct. The redundancy-based error correction is successful when the number of bit errors in the bit pattern entering the redundancy-based error correction unit does not exceed a maximum correctable number of bit errors (e.g. Hamming distance).

According to some exemplary embodiments, the aging-related effects can relate to at least one bit in the uncorrected bit patterns which has a high probability of being incorrect. The bit pattern modifier may then comprise an inverter for inverting the at least one, highly probably incorrect bit of the uncorrected bit pattern. The redundancy-based error correction unit may be configured to correct remaining bit errors in the modified bit pattern produced by the bit pattern modifier. The inverter may comprise a bit-by-bit XOR function, for example, wherein an input of the bit-by-bit XOR function may be a control bit pattern or inversion bit pattern based on the at least one aging bit pattern.

According to some exemplary embodiments, the aging-related effects may relate to at least one bit in the uncorrected bit patterns which has a high probability of being correct. The redundancy-based error correction unit may be configured to correct bit errors in the current, uncorrected bit pattern by using the aging bit pattern and the redundancy information. In particular, the redundancy-based error correction unit may implement cumulative or simultaneous use of the at least one aging bit pattern and the redundancy information, so that the error correction has better and/or faster success. In particular, the aging bit pattern already knows some portions of the correct bit pattern, which means that the error correction algorithm can use this information and can limit the search for possibly incorrect bits to the remaining bits. If the redundancy-based error correction unit uses what is known as a brute force method, the computation complexity for this can normally be reduced considerably on account of the at least one aging bit pattern.

According to some exemplary embodiments, the redundancy-based error correction unit may be configured to transfer the highly probably correct bit as an a priori known bit to the corrected bit pattern in order to assist the redundancy-based error correction unit.

Those skilled in the art will recognize additional features and advantages upon reading the following detailed description, and upon viewing the accompanying drawings.

BRIEF DESCRIPTION OF THE DRAWINGS

Exemplary embodiments of the present invention are described in more detail below with reference to the accompanying figures, in which.

DETAILED DESCRIPTION

Before exemplary embodiments are explained below with reference to the accompanying figures, it is pointed out that elements which are the same or elements which have the same function are provided with the same or similar reference symbols and that a repeat description of these elements may be dispensed with. Descriptions of elements having the same reference symbols are therefore interchangeable.

Figure 1:
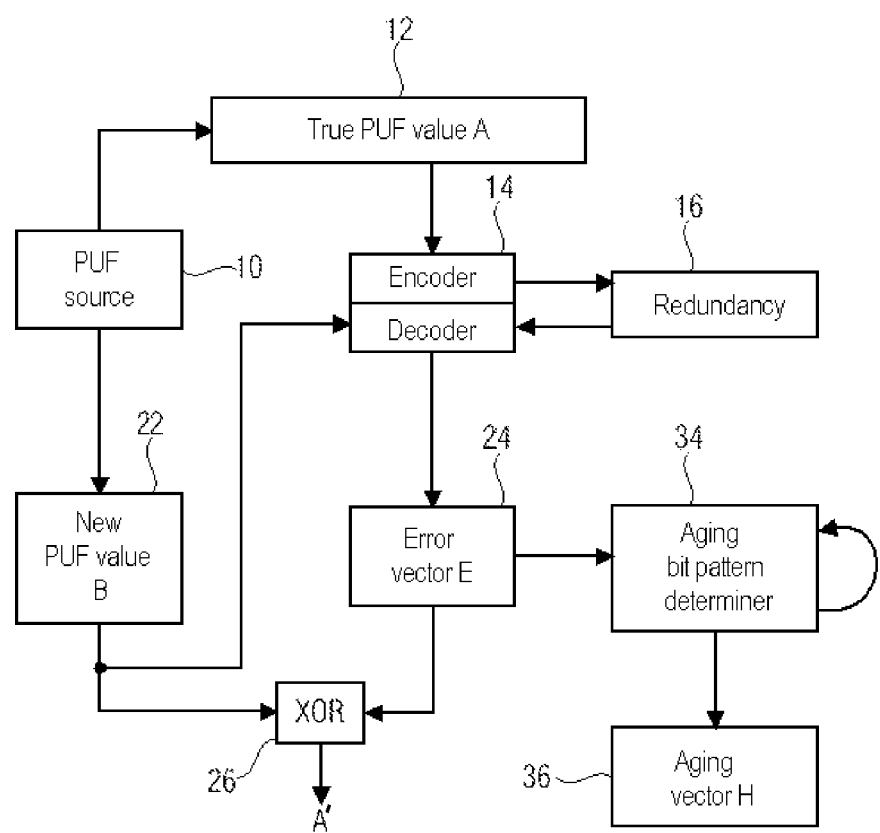
FIG. 1 shows a schematic block diagram to illustrate the technological environment from which an aging vector for a physical hash function can be obtained.

FIG. 1 shows a schematic block diagram to illustrate a basic principle which underlies the technical teaching disclosed herein. As mentioned at the outset, the physical properties of an object can be used to obtain a bit succession (or more generally: bit pattern). The process of producing a bit succession using a physical hash faction from the properties of the physical object is called PUF generation.

One main use of physical hash functions is the following, for example: the physical hash function is used to produce a cryptographical key. By way of example, the bit pattern (PUF bit string) produced by the physical hash function could itself be used as a cryptographical key. Alternatively, the bit pattern produced could be compressed to form a shorter or smaller bit pattern, and the latter could be used as a cryptographical key.

The block diagram shown in FIG. 1 shows the physical object 10 as a source of the physical properties (PUF source) which are included in the physical hash function. The physical hash function is used to generate from the PUF source 10 a bit pattern which, by definition, is regarded as a true bit pattern 12 (true PUF value A). Normally, the true bit pattern 12 is stipulated during a production process or packaging step for the physical object, such as writing or storing data to or in the physical object. Other options for defining which of the bit patterns produced from the PUF source 10 are regarded as a true PUF value A are likewise possible, however.

The true PUF value 12 is used as an input for an encoder 14 which takes the true PUF value 12 as a basis for producing a piece of redundancy information 16. The true PUF value 12 or A can be used in diverse ways. Frequently, it is used as a cryptographical key or for producing a cryptographical key which is based on the true PUF value 12. However, the true PUF value 12 can also be stored in a database, for example, or transmitted to a receiver, as a result of which it is possible to establish at a later time or at another place whether an available physical object matches the one which was used for determining the true PUF value 12. After the true PUF value 12 has been used in one of these ways, it is normally erased in order to render possible misuse difficult.

In contrast to the true PUF value 12, the redundancy information 16 is normally stored on, in or in connection with the physical object used as a PUF source.

At a later time, a new PUF value 22 or B can then be produced from the PUF source 10. By way of example, this may be necessary in order to decrypt data which have been encrypted using the true PUF value 12 or A. For this purpose and also in the case of other possible instances of application, it would be a desirable property of a PUF mechanism for the same physical object to result each time in the same bit pattern in the course of fresh PUF generation. It is desirable that this should particularly also apply under different ambient conditions (temperature, humidity, brightness, electrical and magnetic field strengths, etc.).

In fact, this is not the case. Repeat PUF generation for the same physical object delivers bit patterns which, although very similar to one another, will generally not be identical to one another. It is possible to compensate for this deficit by using methods from coding theory (error correction).

For this purpose, the new PUF value 22 or B is supplied to a decoder which forms an encoder/decoder unit 14 together with the encoder. Using the redundancy information 16, the decoder can correct any incorrect bits in the new PUF value 22, provided that the number of erroneous bits is not greater than a maximum correctable number of error bits. Examples of possible error recognition methods and error correction methods are: Bose-Ray-Chaudhuri code (BCH), Fountain code, Hamming code, Low-Density-Parity-Check code (LDPC), Reed-Muller code and Reed-Solomon code (RS). Using the redundancy-based error correction method used, the decoder can calculate an error vector 24 or E. The error vector 24 can be used to correct the discrepancies from the true PUF value 12 which are present in the new PUF value 22 by logically combining both the new PUF value 22 and the error vector 24 or E using an XOR function 26. This results in a bit pattern A' which is the same as the true PUF value 12, provided that the discrepancies between the new PUF value 22 and the true PUF value 12 were not too great, i.e. were corrected by the decoder by using the redundancy information 16.

In summary, the following can therefore be stated: there is a physical object, namely the PUF source 10. The first PUF bit succession A (true PUF value 12) associated with the object 10 is produced. The bit succession A is regarded as a message in coding theory which needs to be transmitted via a noisy channel, with errors being expected to arise during the transmission, i.e. individual bit entries being expected to collapse (a 0 becomes a 1, or vice versa). In coding theory, this problem is tackled by providing the message A with a redundancy R and transmitting the code word (A, R). If errors occur during the transmission, the redundancy R allows them to be corrected using methods from coding theory. Following the correction, the error-free message word A or A' is normally available again.

Use is made of the same idea in PUF generation: the original PUF value A or 12 is, by definition stipulated as the true PUF value. For the true PUF value A or 12, an associated redundancy value R or 16 is calculated. The value R is stored (for security reasons, the PUF value A itself is not stored and is therefore also not always available). During later fresh PUF generation, a new PUF value B or 22 is obtained. The value B is generally not identical to A, but differs from A only slightly. The aim is to recover the true PUF value. This is achieved using the redundancy R and methods from coding theory:

$$B \rightarrow (B,R) \rightarrow (A,R) \rightarrow A \text{ or } A'$$

The task of reconstructing the true PUF value A from the new PUF value B is successful only if the new PUF value B does not differ too greatly from the true PUF value A.

This is normally the case at the start of the life cycle of a physical object 10. Extensive experimentation and suitable choice of error correction algorithm make it possible to ensure that the reconstruction of the true PUF value 12 or A from the freshly generated PUF value 22 or B will be successful.

However, it can be expected that the situation will worsen in the course of time, as a result of aging processes. That is to say that the PUF values B which are now produced already differ from the original PUF value A to such a degree that reconstruction of A is no longer successful. The technical teaching disclosed herein can provide a remedy at this point.

FIG. 1 shows how, in principle, it is possible to obtain an aging vector 36 or H from the information which is processed in the schematic block diagram from FIG. 1. In particular, the error vector 24 or E indicates how the new PUF value B differs from the true PUF value A, i.e. which bits of the new bit pattern 22 differ from those of the true bit pattern 12. The error vector E is transferred to an aging bit pattern determiner 34. The latter can use at least one earlier aging vector H to establish whether errors are repeated or statistically amassed at a particular bit position. For this purpose, the current error vector E is logically combined in a recursive process with the information which is based on earlier PUF generation operations for obtaining earlier PUF values 22 or B. In this way, it is possible to ascertain a respective current aging vector 36 or H which can be read and analyzed for information purposes.

To date, the problem described above has been solved by equipping the original (the true) PUF value A with a very high level of redundancy R and accordingly using a very powerful code (in the sense of a high level of error correction capability). Such a powerful code with a high level of error correction capability normally requires increased power and surface area for storing the redundancy R or for the execution of the coding algorithm, however. This applies particularly to chip cards. In the case of chip cards, it is possible to use silicon PUFs (silicon-based physical hash functions) for implementing PUFs. With a silicon PUF, various runtimes of circuits are used as a basis for the digitization (PUF generation), for example. The redundancy R is stored in the nonvolatile memory (NVM) of the chip card. The PUF value A is not stored, however, for security reasons.

It should also be noted that a high level of redundancy R can result in the following situation: the PUF value A is secret and normally also needs to remain so. The redundancy R is public, however. When considered from the point of view of information theory, the redundancy R reveals a certain amount of information from A. If R is now higher than A, A would no longer be a secret within the context of information theory. If the redundancy R is lower than A, however, then the following applies: the true secret from A is provided by the difference between the bit length from A and the bit length from R. An example is as follows: let the PUF value A be a bit succession with a length of 500 bits. Let the redundancy R have 400 bits. Since the redundancy R is public, the true PUF value A also contains 100 bits of secret information. From this example, it is thus possible to obtain 100 bits of cryptographical keys from the true PUF value A (for example by XORing 5 bits from A with one another at a time).

In order to assist the redundancy-based error correction, i.e. the error correction on the basis of methods of coding theory, it is possible to use perceptions about the aging effects of the bit pattern. The physical hash function produces a bit pattern which is obtained from a physical process. In principle, we can distinguish three types of bits in the PUF bit pattern:
 a) stable correct bits;
 b) random bits;
 c) stable incorrect bits.

Type a) would be the ideal situation. If there were only bits of this type, the PUF generation would be a deterministic stable process which always leads to the same result. In this case, error correction would not be necessary.

Type b) is the normal situation. A particular bit will generally assume a new particular value, let us say the value 0. Occasionally, however, this bit assumes the value 1 in the course of a new PUF generation operation. This situation is countered by using methods of (redundancy-based) error correction.

Type c): these bits are stable, but their value is always the opposite of the value of the corresponding bit in the true PUF value 12 or A. An example is as follows: the true PUF value A has the bit 0 at position 7. From a certain time onward, however, the bit 1 appears at position 7 for every fresh PUF generation operation. Bits of this type likewise need to be rectified by means of error correction at present.

The number of bits of type c) will increase over the course of time for particular PUF mechanisms. Reference may be made to an aging process.

It should be pointed out that an aging process does not need to depend only on the calendar time which has elapsed. The aging process can also be speeded up by the operating stress of the PUF appliance. By way of example, an appliance which uses a silicon PUF and for which the PUF generation takes place ten thousand times within one calendar year ought to be aged to a greater extent than a comparative appliance in which only 50 PUF generation operations took place in the same period.

According to the technical teaching disclosed herein, bits of type c) (that is to say bits which are simultaneously stable and incorrect) and/or bits of type a) (that is to say bits which are simultaneously stable and correct) are identified, i.e. the positions of such bits are found. If these positions are known, the procedure for the PUF generation can be as follows in the case of the stable, incorrect bits (type c): a PUF value B is generated as previously. In this bit pattern B, all bits are then inverted at the known positions of the type C bits. A new PUF value B' is obtained, with the bit pattern B' being a better approximation of the true PUF value A than B. The redundancy R is used to correct the errors remaining in the bit pattern B', as a result of which the true PUF value A or the assumed true PUF value A' is obtained.

When the positions of stable, good bits (type a) are known, this information can be used as a starting value or a secondary condition for the redundancy-based error correction, which reduces the complexity for the redundancy-based error correction and increases the chances of successful reconstruction of the true PUF value A.

The technical teaching disclosed herein is therefore concerned with identifying stable, incorrect bits and/or stable, good bits in the freshly generated PUF bit pattern in PUF generation mechanisms and immediately rectifying these errors or using this a priori information for further error correction measures, which are based on coding theory, for example. In the case of identified stable incorrect bits, the relevant bit errors are rectified by simply inverting the relevant bits (turn 0 into 1, turn 1 into 0). Only then are the more complicated methods of coding theory used.

Since aging processes mean that the number of such stable and incorrect bits (type c) can increase, the work involvement and computation complexity which the coding theory needs to provide for obtaining the PUF therefore do not become greater over the course of time, but rather remain the same or even become less. In other words, the PUF generation mechanism is future proofed as a result.

An example for the purposes of illustration is as follows: let A be the true PUF value. 10 new PUF generation operations are performed. In doing this, we obtain the bit successions $B_1$, $B_2$, ... $B_{10}$. The respective generated PUF value $B_j$ is processed by means of coding theory. This produces an associated error vector $E_j$. The bit-by-bit XOR sum of $B_j$ and $E_j$ produces the true PUF value A.

In parallel with this procedure, an aging vector H is now produced (the vector H documents the aging process to a certain degree). The aging vector H is at the end of a succession of auxiliary vectors $H_1, H_2, \ldots H_{10}$. The auxiliary vectors $H_j$ are recursively calculated using the error vectors $E_j$:

$$H_{j+1} = E_{j+1} \,\&\, H_j \text{ for } j=0, 1, 2,$$

In this case, '&' represents the element-by-element ANDing of vectors. (From an algebraic point of view, '&' is thus binary multiplication. That is to say that 0&0=0&1=1&0=0 and 1&1=1).

The initialization is the all ones vector:

$$H_0 = 1111 \ldots 1111.$$

For the purposes of the example, a length for the PUF values A and B of 16 bits is assumed.

| Let the true PUF value be A = | 1010 | 1110 | 0100 | 0110 |
|---|---|---|---|---|
| Initialization: $H_0$ = | 1111 | 1111 | 1111 | 1111 |
| $B_1 =$ | 1010 | 0111 | 0100 | 0111 |
| $E_1 =$ | 0000 | 1001 | 0000 | 0001 |
| $H_1 =$ | 0000 | 1001 | 0000 | 0001 |
| $B_2 =$ | 1010 | 0110 | 0100 | 1111 |
| $E_2 =$ | 0000 | 1000 | 0000 | 1001 |
| $H_2 =$ | 0000 | 1000 | 0000 | 0001 |
| $B_3 =$ | 0000 | 0110 | 0100 | 0110 |
| $E_3 =$ | 1010 | 1000 | 0000 | 0000 |
| $H_3 =$ | 0000 | 1000 | 0000 | 0000 |
| $B_4 =$ | 1010 | 0110 | 1100 | 0010 |
| $E_4 =$ | 0000 | 1000 | 1000 | 0100 |
| $H_4 =$ | 0000 | 1000 | 0000 | 0000 |
| $B_5 =$ | 1010 | 0010 | 0100 | 0100 |
| $E_5 =$ | 0000 | 1100 | 0000 | 0010 |
| $H_5 =$ | 0000 | 1000 | 0000 | 0000 |
| $B_6 =$ | 1110 | 0110 | 0100 | 0110 |
| $E_6 =$ | 0100 | 1000 | 0000 | 0000 |
| $H_6 =$ | 0000 | 1000 | 0000 | 0000 |
| $B_7 =$ | 1011 | 0110 | 0100 | 0111 |
| $E_7 =$ | 0001 | 1000 | 0000 | 0001 |
| $H_7 =$ | 0001 | 1000 | 0000 | 0001 |
| $B_8 =$ | 0010 | 0110 | 0101 | 0110 |
| $E_8 =$ | 1000 | 1000 | 0001 | 0000 |
| $H_8 =$ | 0000 | 1000 | 0000 | 0000 |
| $B_9 =$ | 1010 | 0110 | 0101 | 0110 |
| $E_9 =$ | 0000 | 1000 | 0001 | 0000 |
| $H_9 =$ | 0000 | 1000 | 0000 | 0000 |
| $B_{10} =$ | 1010 | 0110 | 0110 | 0110 |
| $E_{10} =$ | 0000 | 1000 | 0010 | 0000 |
| $H_{10} =$ | 0000 | 1000 | 0000 | 0000 |

The following aging vector is obtained:

$$H = H_{10} = 0000\ 1000\ 0000\ 0000$$

The aging vector H is stored together with the redundancy R (from coding theory). The aging vector H facilitates the reconstruction of the true PUF value A from a PUF value B generated in the future as follows:

Replace B with B'=B+H where the + in this case represents the bit-by-bit XORing of the bits of the vector B and the vector H.

This rectifies the aging errors in the vector B'. In the specific example, there is an aging error at the fifth position from the left. The vector B' is already a better approximation to the true PUF value A than the vector B was.

The redundancy R is now used with methods of coding theory to reconstruct the true PUF value A from B'.

Figure 2:
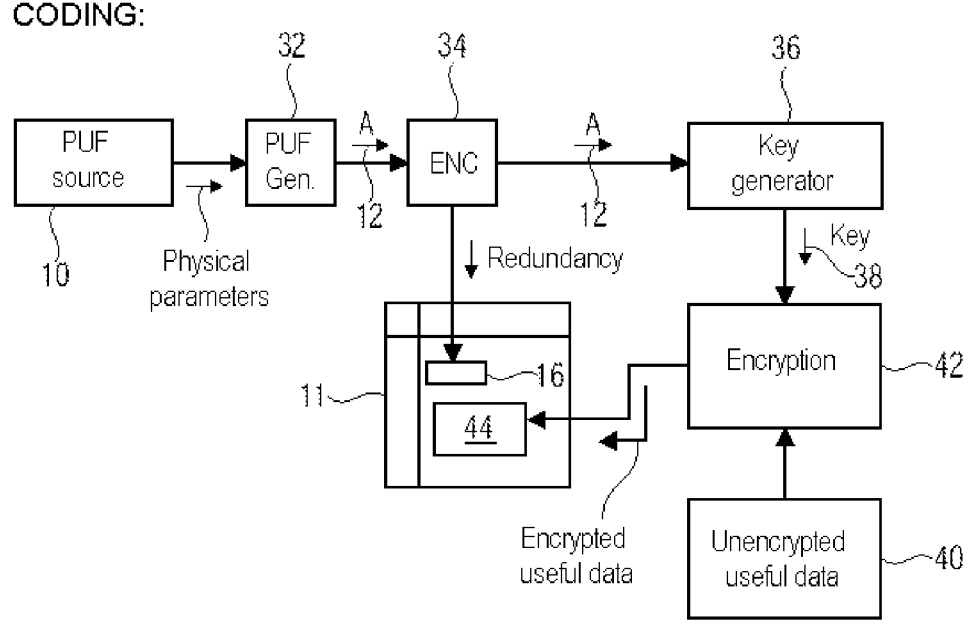
FIG. 2 shows a schematic block diagram to illustrate encryption of unencrypted useful data on the basis of a physical hash function.

FIG. 2 shows a schematic block diagram which illustrates a possible application of a physical hash function for encrypting useful data. FIG. 2 shows the coding or encryption case, while FIG. 3, described further below, shows the corresponding decoding or decryption case.

In the coding or encryption case shown in FIG. 2, physical parameters are determined from the PUF source 10, for example using a measurement function. The physical parameters are as explicitly characteristic as possible for the respective PUF source 10, that is to say the physical object. A physical hash function, in this case PUF generator 32, receives the physical parameters at an input and generates the true PUF value 12 or A therefrom. An output of the physical hash function 32 transmits the true PUF value A to an input of an encoder 34. The encoder 34 processes the true PUF value A and calculates particularly a redundancy 16 or R (Redundancy) for the true PUF value A. The redundancy 16 is stored in a nonvolatile memory ("NVM") 11. By way of example, the nonvolatile memory 11 may be implemented as a PROM (programmable read-only memory), EPROM (erasable programmable read-only memory), EEPROM (electrically erasable programmable read-only memory) or as a flash memory. In principle, however, it is also possible for the redundancy 16 to be printed directly on the physical object 10, for example, in optically readable form, where a later user can read it and input it using an appropriate input interface (keyboard, barcode reader, etc.) in the case of decoding.

The true PUF value A is normally passed through the encoder 34 in unaltered form and is therefore available at an output of the encoder 34. Alternatively, the true PUF value A can also be tapped off directly from the relevant input of the encoder 34. The true PUF value A is supplied to a key generator 36, which produces a cryptographical key 38 from the true PUF value A. By way of example, this key generation can take place in the form that the physical PUF value A is divided into blocks of n bits each. The bits which one of the n blocks contains are then logically combined using a prescribed logic function (for example XORed), which produces the key 38, which has a compressed length in comparison with the bit succession which represents the true PUF value A. By way of example, a 1024-bit true PUF value A can be compressed in a 128-bit key 38 by dividing it into blocks of 8 bits each.

The key 38 is transmitted to an encryption unit 42 which receives unencrypted useful data 40 at another input. The key 38 can be used by the encryption unit 42 to convert the unencrypted useful data 40 into encrypted useful data, which can be stored at a memory location for encrypted useful data 44 in the nonvolatile memory 11. In this way, the encrypted useful data are encrypted indirectly by means of the PUF source 10, that is to say the physical object.

The true PUF value A is normally discarded after the key generation has been performed by the key generator 36. Hence, for later decryption, the key 38 needs to be produced again on the basis of the PUF source 10, which normally requires the presence of the respective physical object.

Figure 3:
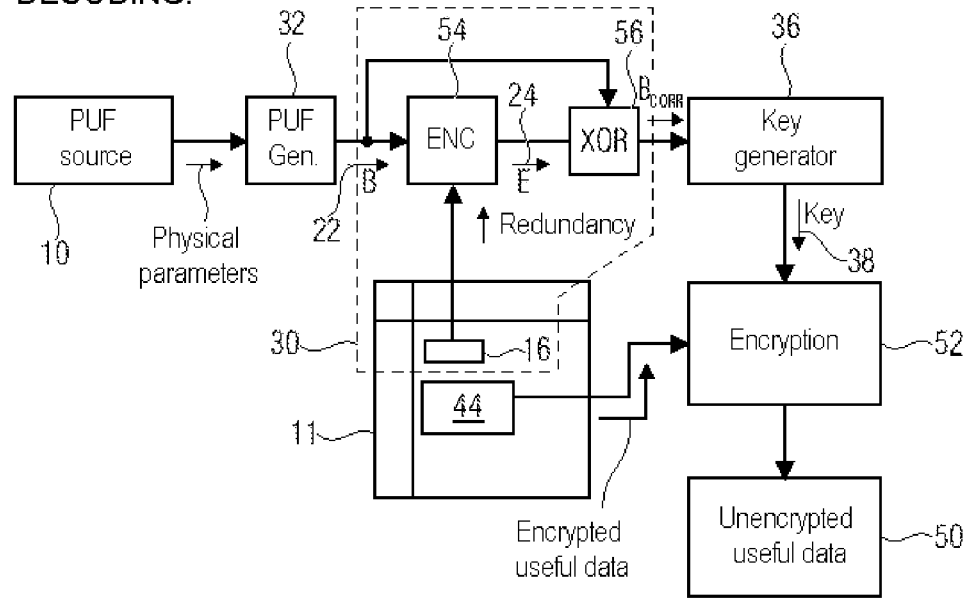
FIG. 3 shows a schematic block diagram to illustrate decryption of an encrypted useful data on the basis of a physical hash function.

FIG. 3 shows a schematic block diagram of the decoding or decryption case which corresponds to the coding or encryption case shown in FIG. 2. The aim is to decrypt the encrypted useful data stored in the nonvolatile memory 11 again. To this end, the physical parameters of the PUF source 10 are again ascertained and are supplied to the physical hash function 32. Since the physical parameters are subject to a certain degree of statistical variance, the physical hash function 32 normally produces a new PUF value 22 or B, which differs from the true PUF value 12 or A to some extent. These discrepancies can, provided that they are not too serious, be corrected by means of a decoder 54 and an XOR function 56. To this end, the decoder 54 reads in the redundancy 16 which has previously been stored in the nonvolatile memory 11 and calculates an error vector 24 or E from the redundancy 16 and the new value PUF value B. The error vector E is then XORed with the new PUF value B on a bit-by-bit basis, this being accomplished by the bit-by-bit XOR function 56. The output of the bit-by-bit XOR function 56 produces a corrected bit pattern $B_{CORR}$, for which B=A is true if the decoding was successful. The corrected bit pattern $B_{CORR}$ can then be used by the key generator 36 in a similar fashion to in FIG. 2 in order to create the key 38. The key 38 is then passed to an input of a decryption section 52, which receives the encrypted useful data 44 at another input. An output of the decryption section 52 then provides unencrypted useful data 50, which essentially match the unencrypted useful data 40 from FIG. 2.

The decoder 54 can either decode the complete bit pattern B in one piece using an appropriately high level of redundancy, or, as an alternative, it is also possible for the uncorrected bit pattern B and the redundancy R each to be split into a plurality of blocks and for the decoding to take place on a block-by-block basis. By way of example, the uncorrected bit pattern B can be divided into blocks of 16 bits and the associated redundancy blocks may have a length of 4, 5 or 6 bits, for example.

As explained above, the success of the decoding by the decoder 54 and the bit-by-bit XOR function 56 is dependent on whether the redundancy 16 great enough to successfully correct the bit errors which the uncorrected bit pattern B contains. Since the PUF source 10 ages with time, age-related or systematic bit errors are also added to random bit errors (type b), which normally cannot be avoided. If the number of random errors and aging-related errors exceeds the number of bits which can be corrected by the redundancy 16 as a maximum, the corrected bit pattern $B_{CORR}$ no longer matches the true PUF value A, and the key generator 36 delivers an incorrect key 38. An incorrect key will also normally cause the decryption 52 to fail, however. The encrypted useful data would therefore no longer be able to be decrypted in this manner and would sometimes be impractical for future uses.

Since the aging bit pattern determiner 134 operates recursively, the aging bit pattern H is initialized. The bit pattern used for initializing the aging bit pattern H may be a bit pattern in which all bits have the value 1 (all ones bit pattern) or the value 0 (all zeros bit pattern), for example. These uniform initialization bit patterns indicate that at the initialization time it can be assumed that, in principle, all bits of the uncorrected bit patterns may be affected by aging-related effects. Only gradually does it emerge which bits are actually either stable and incorrect or stable and good.

Since aging-related effects can sometimes arise only after years, however, it may be the case that interim iterations of the aging bit pattern determiner 134 mean that a bit which is actually affected by the aging effect is no longer indicated in the aging bit pattern H. One possible reason is that the affected bit has behaved like a random bit (type B) in a first phase of the life cycle of the physical object. This can prompt the aging bit pattern determiner 134, after a few iterations (in the extreme case, right after a single iteration), to delete the relevant bit from the aging bit pattern H, i.e. the relevant bit is then no longer treated as a bit which is subject to aging-related effects. Even if the relevant bit were to behave as a stable bit (type A or type C) again at a later time, it would no longer be included in the aging bit pattern H. This can be prevented by virtue of reinitialization taking place at particular times, for example. By way of example, the reinitialization can also be effected only to an extent, so that the entire aging bit pattern H is not reinitialized all at once, but rather only a portion thereof is reinitialized (e.g. firstly all uneven numbered bits, then all even numbered bits, or else: successive reinitialization from the least significant bit (LSB) to the most significant bit (MSB)). In this way, some of the bits stored in the aging bit pattern H are retained, most of which make correct assumptions about the age-related bit errors which the uncorrected bit pattern contains, of course. It may be advisable to bypass the bit pattern modifier 102 for one or more iterations after (re)initialization or to deactivate the influence of the reinitialized bit pattern H on the bit pattern modifier 102 in order to prevent the bit pattern modifier from altering too many bits which were actually correct on account of the initialization bit pattern $H_0$.

Reinitialization can also be triggered under event control, for example when redundancy-based bit error correction which is carried out on the modified bit pattern B' fails repeatedly.

Figure 4:
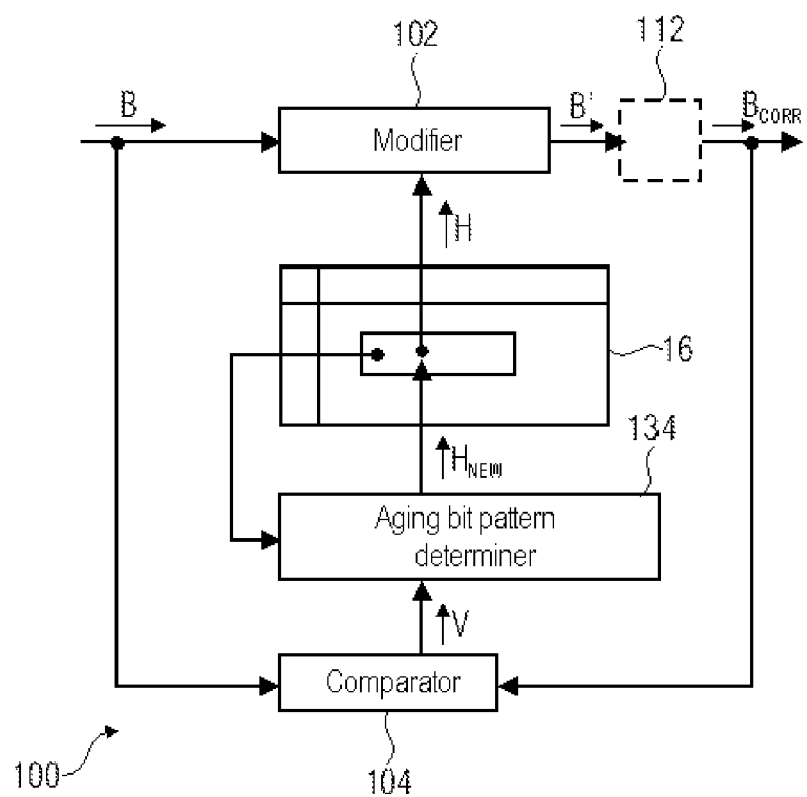
FIG. 4 shows a schematic block diagram of a bit error corrector based on at least one exemplary embodiment of the technical teaching disclosed herein.

FIG. 4 shows a schematic block diagram of a bit error corrector 100 based on an exemplary embodiment of the technical teaching disclosed herein. The bit error corrector is configured to receive an uncorrected bit pattern B at an input. The uncorrected bit pattern B is supplied to a bit pattern modifier 102 and also to a bit pattern comparator 104. The bit pattern modifier 102 also comprises a second input for an aging bit pattern H. Using the uncorrected bit pattern B and the aging bit pattern H, the bit pattern modifier 102 produces a modified bit pattern B'. An optional element 112, which does not necessarily need to be associated with the bit error corrector 100, can also be used to convert the modified bit pattern B' into a corrected bit pattern $B_{CORR}$. Alternatively, it is possible for the modified bit pattern B' to already correspond to the corrected bit pattern $B_{CORR}$, that is to say for no further conversion to be necessary.

Besides the uncorrected bit pattern B, the corrected bit pattern $B_{CORR}$ is also supplied to the bit pattern comparator 104. By way of example, the bit pattern comparator 104 can ascertain a comparative bit pattern V by XORing B and $B_{CORR}$ on a bit-by-bit basis. The comparative bit pattern B indicates those locations at which B and $B_{CORR}$ match or differ from one another. The comparative bit pattern V is transferred to an aging bit pattern determiner 134, which recursively determines a new aging bit pattern $H_{NEW}$ from the comparative bit pattern V and at least one previously stored aging bit pattern. By way of example, the previously stored aging bit pattern can be read from the nonvolatile memory 111 before it is overwritten by the new aging bit pattern $H_{NEW}$.

Figure 5:
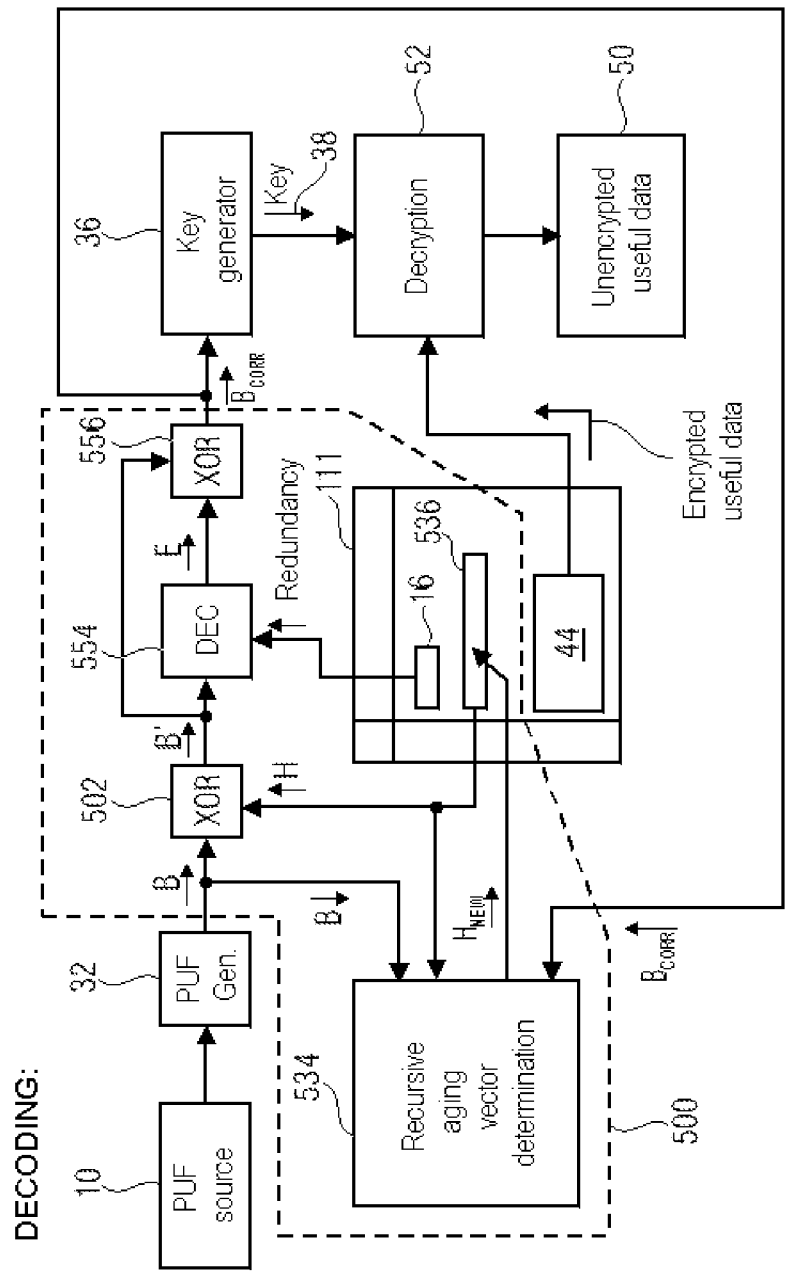
FIG. 5 shows a schematic block diagram to illustrate decryption of encrypted useful data by using a bit error corrector based on a first exemplary embodiment of the technical teaching disclosed herein.

FIG. 5 shows a schematic block diagram to illustrate the decryption or decoding of encrypted useful data using a cryptographical key 38 produced from a PUF value. In particular, FIG. 5 shows how a bit error corrector based on at least one exemplary embodiment of the technical teaching disclosed herein can be used to identify and appropriately correct stable, incorrect bits (type C). The decryption involves the use of a bit error corrector 500 based on at least one exemplary embodiment of the technical teaching disclosed herein. The bit error corrector 500 receives the uncorrected bit pattern B from the physical hash function 32, in a similar manner to in the block diagram shown in FIG. 3. A bit pattern modifier 502 performs bit-by-bit XORing between the uncorrected bit pattern B and an aging bit pattern H, which corrects bit errors which are based on aging-related effects and are assumed to be present in the uncorrected bit pattern. The output of the bit pattern modifier 502 then produces an appropriately modified bit pattern B'. Normally, the modified bit pattern B' is a better approximation to the true PUF value A than the uncorrected bit pattern B. The modified bit pattern B' is forwarded to a decoder 554, which uses a redundancy 16, which is stored in the nonvolatile memory 111, to calculate an error vector E. XORing of the modified bit pattern B' with the error vector E by the bit-by-bit XOR function 556 allows a corrected bit pattern $B_{CORR}$ to be produced, for which it can be assumed with a high level of probability that it matches a bit pattern which represents the true PUF value A. After the corrected bit pattern $B_{CORR}$ has been transferred to the key generator 36, the decryption can be continued essentially as shown in FIG. 3.

The aging bit pattern H used by the bit pattern modifier 502 is stored in the nonvolatile memory 111 at a memory location 536 and can be read from the memory location 536 for the purpose of bit pattern modification. Every new PUF generation operation for a new PUF value or uncorrected bit pattern B provides the opportunity to update the aging bit pattern H by using the information which the uncorrected bit pattern B contains about any aging-related effects. For this purpose, firstly the uncorrected bit pattern B and secondly the corrected bit pattern $B_{CORR}$ are tapped off from the relevant locations and are supplied to a recursive aging bit pattern or aging vector determination section 534.

As a further aging parameter, the recursive aging bit pattern determination section 534 receives the aging bit pattern H, which can be read from the nonvolatile memory 111 or the memory location 536 for the aging bit pattern H. The recursive aging bit pattern determination section 534 uses this information to determine a new aging bit pattern $H_{NEW}$ and write $H_{NEW}$ back to the memory location 536 in the nonvolatile memory 111. From there, the new aging bit pattern $H_{NEW}$ can be used as part of a subsequent iteration or else a plurality of subsequent iterations, in which new uncorrected bit patterns B are respectively determined using the physical hash function 32.

Figure 6:
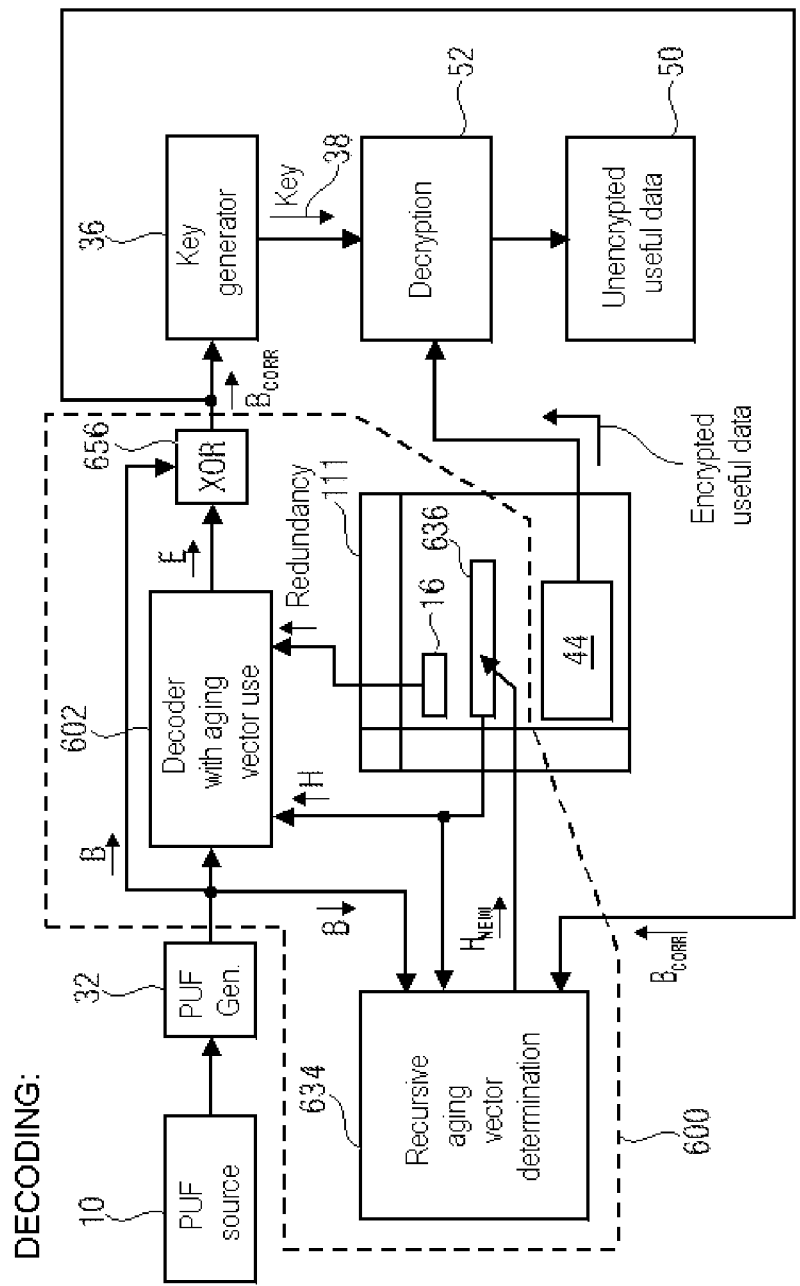
FIG. 6 shows a schematic block diagram to illustrate decryption of encrypted useful data by using a bit error corrector based on a second exemplary embodiment of the technical teaching disclosed herein.

FIG. 6 shows a schematic block diagram to illustrate the decryption of encrypted useful data by using a bit error corrector 600 based on at least one exemplary embodiment of the technical teaching disclosed herein. In contrast to the bit error corrector 500 shown in FIG. 5, the bit error corrector 600 identifies stable, good bits (type A) instead of stable, incorrect bits (type C). The bit error corrector 600 therefore differs from the bit error corrector 500 particularly in the area of the bit pattern modifier 602. The bit pattern modifier 602 comprises a decoder which receives the uncorrected bit pattern B, the aging bit pattern H and the redundancy 16 at appropriate inputs of the bit pattern modifier 602. The aging bit pattern H and the redundancy 16 can be read from appropriate memory locations within the nonvolatile memory 111, with the aging bit pattern being stored at a memory location 636. The bit pattern modifier 602 uses this information in order to calculate the error vector E. Since the decoder has not only the redundancy 16 but also the aging bit pattern H available, in which the highly probably correct bits are identified, the complexity for the decoder is reduced. At the same time, the chances of the error bit pattern E being suitable for correcting all errors in the uncorrected bit pattern B increase. Bit-by-bit XORing of the uncorrected bit pattern B with the error bit pattern E within the bit-by-bit XOR function 656 allows a corrected bit pattern $B_{CORR}$ to be ascertained which can in turn be transmitted to the key generator 36 for further processing.

In this case too, the bit error corrector 600 comprises a recursive aging vector or aging bit pattern determination section 634, which receives the uncorrected bit pattern B and the corrected bit pattern $B_{CORR}$ as inputs. At another input, the aging bit pattern H currently used by the bit pattern modifier 602 is applied. The recursive new aging bit pattern $H_{NEW}$ can then again be written to the memory location 636 in the nonvolatile memory 111.

Figure 7:
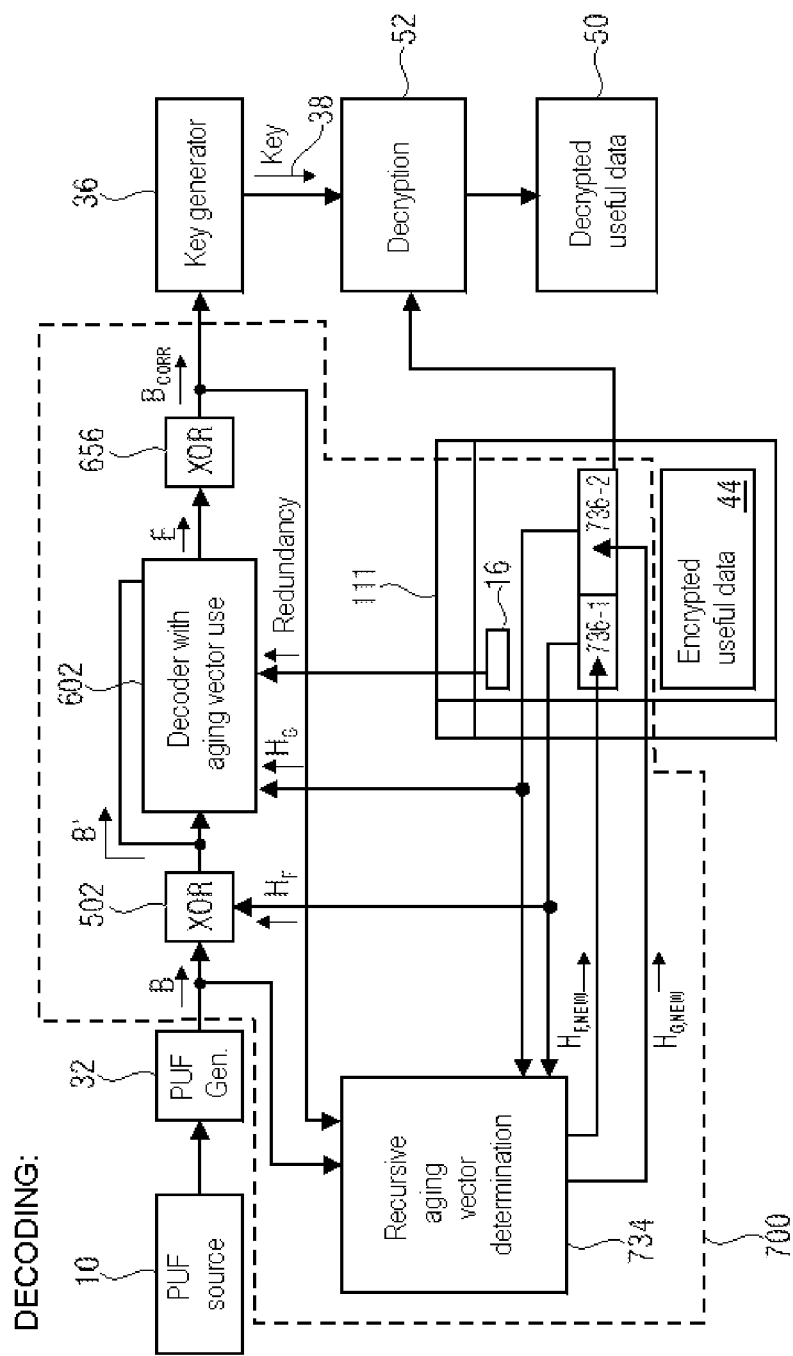
FIG. 7 shows a schematic block diagram to illustrate decryption of encrypted useful data by using a bit error corrector based on a third exemplary embodiment of the technical teaching disclosed herein.

FIG. 7 shows a schematic block diagram of decoding or decryption by using a bit error corrector 700 based on at least one exemplary embodiment of the technical teaching disclosed herein. The bit error corrector 700 can essentially be regarded as a combination of the bit error correctors 500 and 600 from FIGS. 5 and 6. Accordingly, the bit error corrector 700 uses both stable incorrect bits (type C) and stable good bits (type A). The bit error corrector 700 comprises the bit pattern modifier 502 known from FIG. 5 as a first bit pattern modifier and the bit pattern modifier 602 known from FIG. 6 as a second bit pattern modifier. The first bit pattern modifier 502 receives the uncorrected bit pattern B and a portion $H_F$ of the aging bit pattern H, this portion $H_F$ relating to the bits in the succession of uncorrected bit patterns B, which have a high probability of being stable and incorrect (type C). In a similar manner to in the exemplary embodiment from FIG. 5, the first bit pattern modifier 502 outputs a modified bit pattern B' at its output. The modified bit pattern B' is received at an input of the second bit pattern modifier 602, which comprises particularly a decoder which can perform, i.e. is designed for, redundancy-based error correction of the modified bit pattern B' by using a second portion $H_G$ of the aging bit pattern H.

The two portions $H_F$ and $H_G$ of the aging bit pattern H are stored in a memory area 736 of the nonvolatile memory 111, the memory location 736 again being divided into a memory location 736-1 for the portion $H_F$, which indicates the stable, incorrect bits, and a memory location 736-2 for the portion $H_G$, which marks the stable, good bits. The first and second bit pattern modifiers 502, 602 may be configured to access the relevant memory locations 736-1 and 736-2 in order to read in those portions of the aging bit pattern H which are relevant to them.

The output of the second bit pattern modifier 602 produces the error bit pattern E, which is transferred to the bit-by-bit XOR function 656 in order to correct the modified bit pattern B' in respect of the still remaining bit errors (usually random bit errors). The corrected bit pattern $B_{CORR}$ obtained at the output of the bit-by-bit XOR function 656 is in turn transferred to the key generator 36 for further use.

The bit error corrector 700 also comprises a recursive aging bit pattern or aging vector determination section 734. The recursive aging bit pattern determination section 734 comprises four inputs: the uncorrected bit pattern B; the corrected bit pattern $B_{CORR}$; that portion $H_F$ of the aging bit pattern H which indicates the stable, incorrect bits; and that portion $H_G$ of the aging bit pattern H which indicates the stable, good bits. The recursive aging bit pattern determination section or the recursive aging bit pattern determiner 734 is configured to ascertain new values for the two portions $H_{F,NEW}$ and $H_{G,NEW}$ of the aging bit pattern H from this input information and to write them to the relevant memory locations 736-1 and 736-2, respectively.

In FIGS. 5, 6 and 7, the respective bit error correctors 500, 600 and 700 each comprise a portion of the nonvolatile memory 111 which stores particularly the redundancy 16 or R and the aging bit pattern H. In a variant form of this configuration, it is also possible for the bit error corrector 500, 600, 700 to comprise a dedicated nonvolatile memory which is provided specifically for storing the redundancy and the aging bit pattern. In particular, the PUF generator 32, the bit error corrector 500, 600, 700, the key generator 36 and the decryption section 52 could be implemented in an area of a chip which is protected relatively heavily in physical and/or logical terms in order to largely prevent or at least severely complicate reading of the internal data, such as the key 38.

Figure 8:
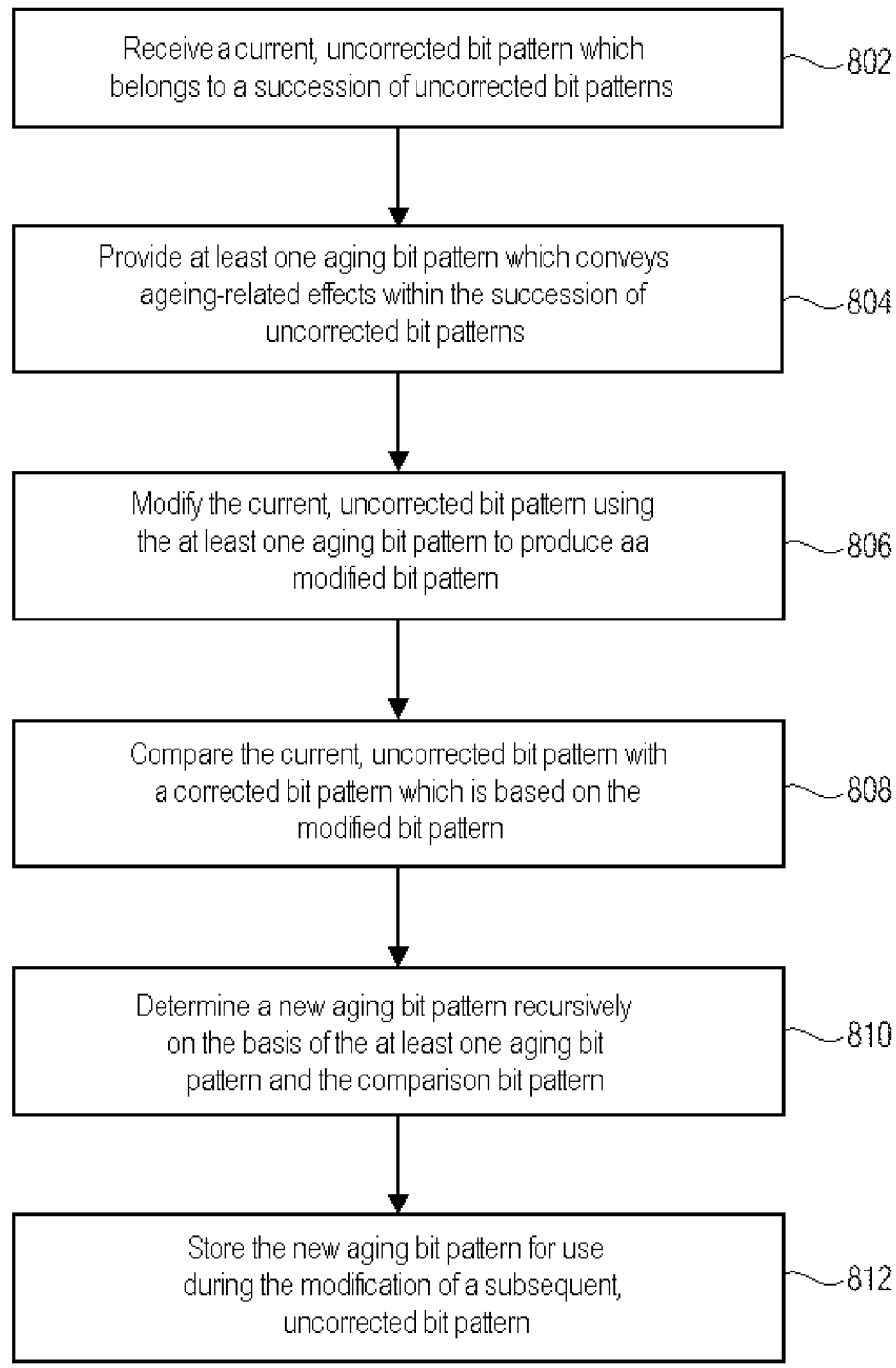
FIG. 8 shows a schematic flowchart of a bit error correction method based on an exemplary embodiment of the technical teaching disclosed herein.

FIG. 8 shows a schematic flowchart of a bit error correction method based on at least one exemplary embodiment of the technical teaching disclosed herein. A current, uncorrected bit pattern is received as part of an action 802 in the bit error correction method. The current, uncorrected bit pattern B is part of a succession of uncorrected bit patterns which are typically produced in the same way, but nevertheless frequently differ from one another. Accordingly, the succession of uncorrected bit patterns may come, by way of example, from a physical hash function which results in said discrepancies between the uncorrected bit patterns B on account of the statistical variance in the physical properties of a physical object which are used as input for the physical hash function.

As part of an action 804, at least one aging bit pattern H is provided which conveys or indicates aging-related effects within the succession of uncorrected bit patterns. By way of example, aging-related effects can be recognized by virtue of individual bits starting from an initial statistical distribution and following a trend which takes the direction of a deterministic variable for the manifestations of this bit. By way of example, the bit may have an initial probability distribution according to which 80% of the relevant bit in the uncorrected bit pattern B and the true bit pattern A matches and 20% does not match. If aging-related effects now mean that the bit in the uncorrected bit pattern B ever more frequently does not match the relevant bit in the true bit pattern A, it will be possible, from a particular threshold value onwards, to refer to the initially random bit having become a stable, incorrect bit over the course of time. By way of example, this threshold value can be chosen such that it is at a probability of 90% of the case in which the bit is incorrect (it would therefore now be correct in only 10% of cases). Alternatively, it is also possible to use other threshold values, for example a bit error probability of 50%, 60%, 75%, 80%, 85%, 95%, 98%, or 99%.

It may also be that a bit becomes a stable, good bit over the course of time. A bit can be regarded as a stable, good bit when there is a very high probability of it delivering the correct value, for example a 99% probability, 99.5% probability or even 99.9% probability.

The current, uncorrected bit pattern is then modified by means of the at least one aging bit pattern in order to produce a modified bit pattern, as indicated as part of action 806 in the bit error correction method. A corrected bit pattern is then produced which is based on the modified bit pattern B', this also including the case in which the corrected bit pattern $B_{CORR}$ is evident from the modified bit pattern B'. As part of action 808, the current, uncorrected bit pattern B is then compared with the corrected bit pattern $B_{CORR}$. The corrected bit pattern $B_{CORR}$ is normally the output of the bit error correction method.

In order to have an updated aging bit pattern H available for subsequent uncorrected bit patterns $B_{i+1}$, a new aging bit pattern is recursively determined at action 810. The recursive determination is effected on the basis of the at least one aging bit pattern H and the comparative bit pattern.

As part of action 812, the new aging bit pattern $H_{i+1}$ is stored for use during the later modification of a subsequent, uncorrected bit pattern $B_{i+1}$. The bit error correction method is then carried out again starting with the action 802.

Although some aspects have been described in connection with an apparatus, it goes without saying that these aspects are also a description of the corresponding method, which means that a block or an element of an apparatus can also be understood to mean a corresponding method step or a feature of a method step. Similarly, aspects which have been described in connection with or as a method step are also a description of a corresponding block or detail or feature of a corresponding apparatus. Some or all of the method steps can be carried out by a hardware apparatus (or by using a hardware apparatus), such as a microprocessor, a programmable computer or an electronic circuit. In some exemplary embodiments, some or a plurality of the most important method steps can be carried out by such an apparatus.

Depending on particular implementation requirements, exemplary embodiments of the invention may be implemented in hardware or in software. The implementation can be carried out by using a digital storage medium, for example a floppy disk, a DVD, a Blu-ray disk, a CD, a ROM, a PROM, an EPROM, an EEPROM or a FLASH memory, a hard disk or another magnetic or optical memory, which stores electronically readable control signals which can interact or do interact with a programmable computer system such that the respective method is carried out. The digital storage medium may therefore be computer readable.

Some exemplary embodiments based on the invention thus comprise a data storage medium which has electronically readable control signals which are capable of interacting with a programmable computer system such that one of the methods described herein is carried out.

In general, exemplary embodiments of the present invention may be implemented as a computer program product with a program code, said program code being effective for carrying out one of the methods when the computer program product is running on a computer.

The program code may also be stored on a machine readable storage medium, for example.

Other exemplary embodiments comprise the computer program for carrying out one of the methods described herein, wherein the computer program is stored on a machine readable storage medium.

In other words, an exemplary embodiment of the method according to the invention is therefore a computer program which has a program code for carrying out one of the methods described herein when the computer program is running on a computer.

A further exemplary embodiment of the methods according to the invention is therefore a non-transitory data storage medium (or a digital storage medium or a computer readable medium) on which the computer program for carrying out one of the methods described herein has been recorded.

A further exemplary embodiment of the method according to the invention is therefore a data stream or a sequence of signals which represent(s) the computer program for carrying out one of the methods described herein. By way of example, the data stream or the sequence of signals may be configured to be transferred via a data communication link, for example via the internet.

A further exemplary embodiment comprises a processing device, for example a computer or a programmable logic element, which is configured or customized to carry out one of the methods described herein.

A further exemplary embodiment comprises a computer on which the computer program for carrying out one of the methods described herein is installed.

A further exemplary embodiment based on the invention comprises an apparatus or a system which is designed to transmit a computer program for carrying out at least one of the methods described herein to a receiver. The transmission can be effected electronically or optically, for example. The receiver may be a computer, a mobile appliance, a memory appliance or a similar apparatus, for example. The apparatus or the system may comprise a file server for transmitting the computer program to the receiver, for example.

In some exemplary embodiments, a programmable logic element (for example a field programmable gate array, an FPGA) can be used to carry out some or all functionalities of the methods described herein. In some exemplary embodiments, a field programmable gate array can interact with a microprocessor in order to carry out one of the methods described herein. In general, the methods in some exemplary embodiments are carried out by an arbitrary hardware apparatus. This may be a piece of universally useable hardware such as a computer processor (CPU) or hardware which is specific to the method, such as an ASIC.

The exemplary embodiments described above are merely an illustration of the principles of the present invention. It goes without saying that modifications and variations to the arrangements and details described herein will be apparent to other persons skilled in the art. The intention is therefore that the invention be limited merely by the scope of protection of the patent claims below rather than by the specific details which have been presented herein by means of the description and the explanation of the exemplary embodiments.

What is claimed is:

1. A bit error corrector, comprising:
    an aging bit pattern memory operable to store at least one aging bit pattern which conveys aging-related effects within a succession of uncorrected bit patterns;
    a bit pattern modifier operable to modify a current, uncorrected bit pattern using the at least one aging bit pattern, and generate a modified bit pattern;
    a bit pattern comparator operable to compare the current, uncorrected bit pattern with a corrected bit pattern which is based on the modified bit pattern, and determine a corresponding comparative bit pattern; and
    an aging bit pattern determiner operable to recursively determine a new aging bit pattern based on the at least one aging bit pattern and the comparative bit pattern, and store the new aging bit pattern in the aging bit pattern memory for use during modification of a subsequent uncorrected bit pattern by the bit pattern modifier.

2. The bit error corrector as claimed in claim 1, further comprising an input for the succession of uncorrected bit patterns which is configured to be connected to an output of a generator for a bit pattern based on a physical hash function, wherein the aging-related effects are attributed to the physical hash function.

3. The bit error corrector as claimed in claim 1, further comprising an initializer operable to reset the at least one aging bit pattern stored in the aging bit pattern memory to an initial value.

4. The bit error corrector as claimed in claim 1, wherein the aging bit pattern memory is operable to store at least one further aging bit pattern relating to preceding recursions, and wherein the aging bit pattern determiner is operable to identify a trend for the aging-related effects using at least one of the aging bit pattern and the at least one further aging bit pattern and to recursively determine the new aging bit pattern based on the trend.

5. The bit error corrector as claimed in claim 4, wherein the aging bit pattern determiner comprises a counter operable to count a manifestation of an aging-related effect on at one least bit of the uncorrected bit patterns in the comparative bit pattern, the aging bit pattern and the at least one further aging bit pattern, and wherein the aging bit pattern determiner is operable to allow for a corresponding counting result during the recursive determination of the at least one bit of the new aging bit pattern.

6. The bit error corrector as claimed in claim 4, wherein the aging bit pattern determiner comprises a filter operable to filter at least one bit in the comparative bit pattern and in at least one from the aging bit pattern and the at least one further aging bit pattern and to allow for a corresponding filter result during the recursive determination of the at least one bit of the new aging bit pattern.

7. The bit error corrector as claimed in claim 1, further comprising:
    a redundancy memory operable to store a piece of redundancy information; and
    a redundancy-based error correction unit operable to correct bit errors in the uncorrected bit pattern or the modified bit pattern using the redundancy information.

8. The bit error corrector as claimed in claim 7, wherein the aging-related effects relate to at least one bit in the uncorrected bit patterns which has a high probability of being incorrect, wherein the bit pattern modifier comprises a controllable inverter operable to invert the at least one highly probable incorrect bit of the uncorrected bit pattern, and wherein the redundancy-based error correction unit is operable to correct the remaining bit errors in the modified bit pattern produced by the bit pattern modifier.

9. The bit error corrector as claimed in claim 7, wherein the aging-related effects relate to at least one bit in the uncorrected bit patterns which has a high probability of being correct, and wherein the redundancy-based error correction unit is operable to correct bit errors in the current, uncorrected bit pattern based on the aging bit pattern and the redundancy information.

10. The bit error corrector as claimed in claim 9, wherein the redundancy-based error correction unit is operable to transfer the highly probable correct bit as an a priori known bit to the corrected bit pattern to assist the redundancy-based error correction unit.

11. The bit error corrector as claimed in claim 7, wherein the aging-related effects relate both to bits from a first group in the uncorrected bit patterns which have a high probability of being correct and to bits from a second group which have a high probability of being incorrect, wherein the bit pattern modifier comprises an inverter operable to invert bits from the first group of the uncorrected bit pattern and produce the modified bit pattern, and wherein the redundancy-based error correction unit is operable to correct errors in the modified bit pattern by using the redundancy information and portions of the aging bit pattern which relate to the bits in the second group.

12. The bit error corrector as claimed in claim 1, wherein the new aging bit pattern is recursively determined based on $H_{j+1} = E_{+1}$ & $H_j$, where $H_{j+1}$ is the new aging bit pattern, $H_j$ is the aging bit pattern, $E_{j+1}$ is the comparative bit pattern, and the & is a bit-by-bit logic AND operation.

13. The bit error corrector as claimed in claim 1, wherein the new aging bit pattern is recursively determined based on $H_{j+1} = E_{j+1}$ OR $H_j$, where $H_{j+1}$ is the new aging bit pattern, $H_j$ is the aging bit pattern, $E_{j+1}$ is the comparative bit pattern, and OR is a bit-by-bit logic OR operation.

14. The bit error corrector as claimed in claim 1, further comprising a bit pattern generator operable to produce the uncorrected bit pattern by digitizing physical properties of an object.

15. The bit error corrector as claimed in claim 1, further comprising:
    a key generator operable to produce a cryptographical key using the corrected bit pattern; and
    a decoder operable to decrypt encrypted data by using the cryptographical key.

16. A bit error corrector, comprising:
    an aging bit pattern memory operable to store at least one aging bit pattern conveying which at least one bit within an uncorrected bit pattern from a succession of uncorrected bit patterns has a high probability of being incorrect;

a bit inverter operable to invert the at least one highly probable incorrect bit in the uncorrected bit pattern;

a redundancy-based error correction unit operable to correct bit errors in the modified bit pattern using a piece of redundancy information and determine a corresponding corrected bit pattern;

a bit pattern comparator operable to compare the current uncorrected bit pattern with the relevant corrected bit pattern and determine a corresponding comparative bit pattern; and an aging bit pattern determiner operable to recursively determine a new aging bit pattern based on the at least one aging bit pattern and on the comparative bit pattern, and store the new aging bit pattern in the aging bit pattern memory for use as a piece of control information for the bit inverter during the inversion of the at least one highly probable incorrect bit in a subsequent uncorrected bit pattern.

17. A bit error correction method, comprising:

receiving a current uncorrected bit pattern belonging to a succession of uncorrected bit patterns;

providing at least one aging bit pattern conveying aging-related effects within the succession of uncorrected bit patterns;

modifying the current uncorrected bit pattern using the at least one aging bit pattern to generate a modified bit pattern;

comparing the current uncorrected bit pattern with a corrected bit pattern which is based on the modified bit pattern to generate a comparative bit pattern;

recursively determining a new aging bit pattern based on the at least one aging bit pattern and the comparative bit pattern; and storing the new aging bit pattern for use during the modification of a subsequent uncorrected bit pattern.

18. A non-transitory computer readable medium storing a computer program configured to correct bit errors in a current uncorrected bit pattern belonging to a succession of uncorrected bit patterns, the computer program comprising:

program instructions to provide at least one aging bit pattern conveying aging-related effects within the succession of uncorrected bit patterns;

program instructions to modify the current uncorrected bit pattern using the at least one aging bit pattern to generate a modified bit pattern;

program instructions to compare the current uncorrected bit pattern with a corrected bit pattern which is based on the modified bit pattern to generate a comparative bit pattern;

program instructions to recursively determine a new aging bit pattern based on the at least one aging bit pattern and the comparative bit pattern; and program instructions to store the new aging bit pattern for use during the modification of a subsequent uncorrected bit pattern.

19. The non-transitory computer readable medium as claimed in claim 18, further comprising:

program instructions to store a piece of redundancy information in a redundancy memory; and program instructions to correct bit errors in the uncorrected bit pattern or the modified bit pattern using the redundancy information.

20. The non-transitory computer readable medium as claimed in claim 18, further comprising program instructions to reset the at least one aging bit pattern to an initial value.

* * * * *

UNITED STATES PATENT AND TRADEMARK OFFICE
CERTIFICATE OF CORRECTION

PATENT NO.         : 8,726,123 B2                                        Page 1 of 1
APPLICATION NO.    : 13/548462
DATED              : May 13, 2014
INVENTOR(S)        : R. Goettfert et al.

It is certified that error appears in the above-identified patent and that said Letters Patent is hereby corrected as shown below:

In the Claims
  Column 17, line 57 (claim 5, line 3), please change "at one least" to -- at least one --
  Column 18, line 47 (claim 12, line 3), please change "$=E_{+1}$" to -- $=E_{j+i}$ --

Signed and Sealed this
Ninth Day of September, 2014

Michelle K. Lee
*Deputy Director of the United States Patent and Trademark Office*